3,849,390
H-THR-LYS-ARG-OH AND DERIVATIVES THEREOF
William H. McGregor, Chester, and Norman H. Grant, Delaware, Pa., assignors to American Home Products Corporation, New York, N.Y.
No Drawing. Filed Oct. 29, 1973, Ser. No. 410,584
Int. Cl. A61k *27/00;* C07c *103/52*
U.S. Cl. 260—112.5                                     10 Claims

ABSTRACT OF THE DISCLOSURE

The novel tripeptide H-Thr-Lys-Arg-OH as well as α-amino protected and/or side chain amino protected and/or carboxyl ester derivatives thereof are described. The compounds described herein either increase the release of luteinizing hormone (LH) or are intermediates for producing compounds having such utility.

---

The present invention relates to novel tripeptides, processes for their preparation and uses for such peptides.

The phagocytosis-stimulating peptide tuftsin has been identified as the tetrapeptide Thr-Lys-Pro-Arg-OH [See Nishioka et al., Biochimica et Biophysica Acta, *310,* pp. 217–229 (1973)]. There has been no report in the literature that this tetrapeptide stimulates the release of LH. Tests conducted by the assignee of this application using cultured pituitary cells failed to show that this tetrapeptide either stimulated or inhibited the release of LH. It has now been discovered that modifications of the tuftsin structure produce compounds which stimulate the secretion of LH.

The tripeptides of the present invention are represented by compounds of the formula

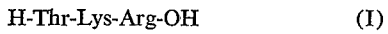
$$\text{H-Thr-Lys-Arg-OH} \qquad (I)$$

and

$$\text{R-Thr}(R^1)\text{-Lys}(R^2)\text{-Arg}(N^G\ R^3)\text{-OR}^4 \qquad (II)$$

and acid addition salts of such compounds, wherein:

$N^G$ refers to the side chain nitrogen atoms in arginine;

R is either hydrogen or an α-amino protecting group;

$R^1$ is a protecting group for the alcoholic hydroxyl group of threonine or $R^1$ is hydrogen which means there is no protecting group on the hydroxyl function;

$R^2$ is a protecting group for the side chain amino substituent of lysine or $R^2$ is hydrogen which means there is no protecting group on the side chain substituent;

$R^3$ is a protecting group for the $N^\delta$, $N^\omega$ and $N^{\omega'}$ nitrogens of arginine or $R^3$ is hydrogen which means there are no protecting groups on the side chain nitrogen atoms;

$R^4$ is selected from the class consisting of hydrogen or $R^4$ is a α-carboxyl protecting group; within the proviso that at least one of R, $R^1$, $R^2$, $R^3$ and $R^4$ is other than hydrogen.

The α-amino protecting groups contemplated by R are those known to be useful in the art in the step-wise synthesis of polypeptides. The selection of the α-amino protecting group throughout the synthesis should fulfill the following requirements (a) retain its protecting properties (i.e. not be split off under coupling conditions), (b) not give rise to side reactions or otherwise interfere in the synthesis of the tripeptides and (c) be removable under conditions that will not split the tripeptide chain. Among the classes of α-amino protecting groups covered by R are (1) acyl type protecting groups illustrated by the following: formyl, trifluoroacetyl, phthalyl, toluenesulfonyl (tosyl), benzenesulfonyl, nitrophenylsulfenyl, tritylsulfenyl, o-nitrophenoxyacetyl, chloroacetyl, acetyl, γ-chlorobutyryl, etc.; (2) aromatic urethan type protecting groups illustrated by benzyloxycarbonyl and substituted benzyloxycarbonyl such as p-chlorobenzyloxycarbonyl, p-nitrobenzyloxycarbonyl, p - bromobenzyloxycarbonyl, p-methoxybenzyloxycarbonyl; (3) aliphatic urethan protecting groups illustrated by *tert*-butyloxycarbonyl, diisopropylmethoxycarbonyl, isopropyloxycarbonyl, ethoxycarbonyl, allyloxycarbonyl; (4) cycloalkyl urethan type protecting groups illustrated by cyclopentyloxycarbonyl, adamantyloxycarbonyl, cyclohexyloxycarbonyl; (5) thio urethan type protecting groups such as phenylthiocarbonyl; (6) alkyl type protecting groups as illustrated by triphenylmethyl (trityl), benzyl; (7) trialkylsilane groups such as trimethylsilane. The preferred α-amino protecting group defined by R is *tert*-butyloxycarbonyl (hereinafter identified as "BOC").

The protecting groups contemplated by $R^1$ are selected from the class consisting of acetyl, tosyl, benzoyl, *tert*-butyl, trityl, benzyl and benzyloxycarbonyl;

Suitable side chain amino protecting groups defined by $R^2$ are benzyl, chlorobenzyloxycarbonyl, benzyloxycarbonyl, tosyl, 2,4 dinitrophenyl, t-amyloxycarbonyl, t-butyloxycarbonyl, etc. The selection of such a side chain amino protecting group is not critical except that it must be one which is not removed during cleavage of the α-amino protecting group during the synthesis until the peptide of the desired amino acid sequence is obtained. Hence, the α-amino protecting and side chain amino protecting group cannot be the same;

The protecting group $R^3$ on the $N^\delta$, $P^\omega$ and $N^{\omega'}$ of arginine is illustrated by nitro, tosyl, benzyloxycarbonyl, adamantyloxycarbonyl and trityl. In the case of nitro or tosyl the protecting group is on either one of the $N^\omega$, $N^{\omega'}$ nitrogens and in the case of benzyloxycarbonyl, trityl and adamantyloxycarbonyl, the protecting group is on the $N^\delta$ nitrogen and either one of the $N^\omega$, $N^{\omega'}$ nitrogen atoms.

Illustrative of $R^4$ carboxyl protecting group are $C_1$–$C_6$ alkyl (e.g. methyl, ethyl, butyl, pentyl, isobutyl, etc.); benzyl; substituted benzyl wherein the substituent is selected from at least one of nitro, methoxy and methyl (e.g. p-methoxybenzyl, p-nitrobenzyl, 2,4-dimethoxybenzyl, 2,4,6-trimethylbenzyl, pentamethylbenzyl), phenacyl, phthalimidomethyl, β-methylthioethyl, 4-picolyl and 4-(methylthio)phenyl. Preferably $R^4$ is $C_1$–$C_6$ alkyl, benzyl or substituted benzyl.

A preferred compound within the scope of formula II is one wherein each of $R^1$, $R^2$, $R^3$ and $R^4$ are hydrogen and R is BOC. This compound is not only an intermediate for obtaining a compound of formula I but also is effective in stimulating the secretion of LH.

Illustrative of suitable non-toxic, pharmaceutically acceptable acid addition salts of the compounds of formulas I and II are hydrochloride, hydrobromide, sulfate, phosphate, maleate, acetate, citrate, benzoate, succinate, malate, ascorbate, and the like.

All chiral amino acid residues identified in formulas I and II supra, and the other formulas hereinafter are of the natural or L-configuration unless specified otherwise.

The tripeptides of formulas I and II are prepared in accordance with the reaction scheme shown in the flow diagram appended hereto. With reference to such flow diagram, the compound R-Thr($R^1$)-OH of formula A is reacted with a carboxyl group activating reagent to form a carboxyl group activated derivative of formula A which is then coupled with a carboxylic acid ester of lysine (formula B) at a temperature between about −30° C. and +30° C. to form the dipeptide of formula C. The coupling is carried out throughout the synthesis in the presence of a inert organic solvent such as dichloromethane, acetonitrile, dimethylformamide, chloroform, dioxane, toluene, methylene chloride, etc. If the compound of formula B is added to the reaction medium as an acid addition salt, an acid acceptor is included in the reaction medium so that a free base is formed *in situ* which reacts with the activated derivative of a compound of formula A. Suitable acid acceptors include tertiary amines (e.g. triethylamine, pyridine, quinoline, dimethylaniline, etc.) alkali metal carbonates or other acid binding agents known in the art.

Following the formation of formula (C), the C-terminal ester is converted to the free acid of formula (D) by saponification. This dipeptide of formula (D) is then coupled to a carboxylic ester of arginine defined by formula E at a temperature between about −30° C. and +30° C. to obtain a tripeptide of formula (F), this reaction being carried out by first activating the carboxylic group of the dipeptide of formula D with a carboxyl group activating reagent. The compound of formula E is preferably used in the form of an acid addition salt. The compound of Formula E, which is preferably in the form of a salt, may be present in the reaction medium while the carboxyl group activated derivative of a compound of formula D is being formed or it may be added to the reaction vessel after the activated compound has been formed. Thereafter, the tripeptide of formula F may be treated in any number of ways to obtain a compound of formula (G) or (H). Preferably the compound of formula (F) is treated with a cleaving reagent that will cleave the side chain protecting groups and the $R^4$ group, without cleavage of the α-amino protecting group. Cleavage can effectively be accomplished by hydrogenation over a palladium catalyst, particularly where the α-amino protecting group is BOC, which is stable to the hydrogenation. As a result of such cleavage the tripeptide of formula G is obtained which can be converted to the deprotected tripeptide of formula (H) by cleaving the α-amino protecting group with a suitable reagent such as trifluoroacetic acid. Other cleaving reagents may be used such as liquid hydrogen fluoride, HBr in acetic acid, alcoholic solution of HCl, sodium in liquid ammonia, depending on the particular α-amino protecting group. The selection of suitable cleaving reagents and process conditions for removing the side chain protecting groups, α-amino protecting group, and carboxyl protecting group is well within the skill of the art and is described by Schroder and Lubke 1, pp. 72–75 (Academic Press 1965), the disclosure of which is incorporated herein by reference.

As an alternative to obtaining the tripeptide of formula (G), it is also possible to first select a cleaving reagent that will only remove the α-amino protecting group, thus producing a compound of the formula

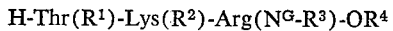
H-Thr($R^1$)-Lys($R^2$)-Arg($N^G$-$R^3$)-$OR^4$ and thereafter cleave the side chain protecting groups. Thus if R is BOC, $R^1$ benzyl, and $R^2$ is benzyloxycarbonyl, the use of trifluoroacetic acid will only cleave the BOC group whereas if hydrogenation over palladium is used the benzyl and benzyloxycarbonyl groups will be cleaved but not BOC. The foregoing compound of the formula

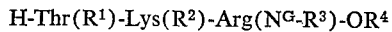
H-Thr($R^1$)-Lys($R^2$)-Arg($N^G$-$R^3$)-$OR^4$ may then be saponified to obtain the compound

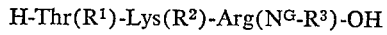
H-Thr($R^1$)-Lys($R^2$)-Arg($N^G$-$R^3$)-OH after which the side chain protecting groups $R^1$, $R^2$ and $R^3$ are cleaved or in a single step both the side chain protecting groups $R^1$, $R^2$ and $R^3$ and the carboxyl protecting group $R^4$ may be cleaved such as by hydrogenation, as previously described.

The carboxyl group activating reagents used in the aforedescribed synthesis are those well known in the peptide art. Illustrative of these are: (1) carbodiimides (e.g. N,N¹-dicyclohexycarbodiimide, N-ethyl N¹-(γ-dimethylamino propyl carbodiimide); (2) cyanamides (e.g. N,N-dibenzylcyanamide; (3) keteimines; (4) isoxazolium salts (e.g. N-ethyl-5-phenyl isoxazolium-3¹-sulfonate; (5) monocyclic nitrogen containing heterocyclic amides of aromatic character containing one through four nitrogens in the ring such as imidazolides, pyrazolides, 1,2,4-triazolides. Specific heterocyclic amides that are useful include N,N¹-carbonyldiimidazole, N,N¹-carbonyl-di-1,2,4-triazole; (6) alkoxylated acetylene (e.g. ethoxyacetylene); (7) reagents which form a mixed anhydride with the carboxyl moiety of the amino acid (e.g. ethylchloroformate, isobutylchloroformate) and (8) nitrogen-containing heterocyclic compounds having a hydroxy group on one ring nitrogen (e.g. N-hydroxyphthalimide, N-hydroxysuccinimide, 1-hydroxybenzotriazole). Other activating reagents and their use in peptide coupling are described by Schroeder and Lubke supra, in Chapter III and by Kapoor, J. Pharm. Sci., 59, pp. 1–27 (1970).

A particularly suitable activating agent for a compound of formula (A) is carbonyldiimidazole and for a compound of formula D is the combination of N,N¹-dicyclohexylcarbodiimide (DCC) and N-hydroxybenzotriazole, or N-hydroxysuccinimide which minimizes racemization.

In selecting a particular side chain protecting group to be used in the synthesis of the peptides of formula (I) and (II) the following rules should be followed: (a) the protecting group must retain its protecting properties (i.e. not be split off under coupling conditions), and (b) the side chain protecting group must be removable upon the completion of the synthesis containing the desired amino acid sequence under reaction conditions that will not alter the peptide chain.

The following examples are illustrative of the preparation of the compounds of the present invention.

EXAMPLE 1

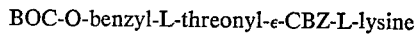
BOC-O-benzyl-L-threonyl-ε-CBZ-L-lysine 742 mg. (2.4 meq.) BOC-O-benzyl-L-threonine and carbonyldiimidazole (390 mg., 2 meq.) are combined in 5 ml. dimethylformamide for 0.5 hrs. at 0° C. and 40 min. at ambient temperature. To this solution is added 860 mg. (2.6 meq.) of ε-CBZ-L-lysine methyl ester hydrochloride in 10 ml. dimethylformamide containing 0.36 ml. (2.6 meq.) of triethylamine. After 30 min. at 0° C. the reaction is continued overnight at ambient temperature. After removing the solvent under reduced pressure (<30° C.) ethyl acetate is added to the residue and extracted in the usual manner with 5% $KHSO_4$ and 5% $KHCO_3$ and dried over $Na_2SO_4$ (1.19 g.).

This product (1.19 g., 2 meq.), which is shown to be homogeneous in several solvent systems on TLC, is saponified in 7 ml. of methanol containing 2.5 ml. N NaOH over a period of 3 hours at ambient temperature and overnight at 4° C. Acidification with 5% citric acid at 0° C. and extraction with ethyl acetate gave after drying and chromatography on silica gel in the system chloroform:methanol:acetic acid (8.5:10:5), a yield of 1.1 g. of the above titled product.

EXAMPLE 2

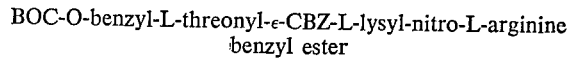
BOC-O-benzyl-L-threonyl-ε-CBZ-L-lysyl-nitro-L-arginine benzyl ester 1.1 g. (2 meq.) BOC-O-benzyl-L-threonyl-ε-CBZ-L-lysine, 3.24 mg. (2 meq.) of hydroxybenzotriazole and 413 mg. (2 meq.) of dicyclohexylcarbodiimide are reacted 45 min. at 0° C. and 1.03 g. (2.2 meq.) of nitro-L-arginine benzyl ester hydrochloride and 0.3 mls. (2.2 meq.) of triethylamine is added and further reacted overnight at 4° C. The reaction mixture is filtered, the solvent removed under reduced pressure and the residue dissolved in ethyl acetate. This solution is extracted in the usual fashion with 5% potassium bisulfate and 5% potassium bicarbonate and yields after drying 1.4 g. of semi-pure product. After chromatography on silica gel (chloroform/methanol 10/1) 600 mg. of the above titled pure protected peptide (TLC S.G. $CHCl_3$/MeOH 10:1 $R_f$ 0.80) is obtained.

EXAMPLE 3

BOC-L-threonyl-L-lysyl-L-arginine diacetate

BOC - O - benzyl - L - threonyl-ε-CBZ-L-lysyl-nitro-L-arginine benzyl ester 600 mg. is hydrogenated at atmospheric pressure in methanol containing acetic acid and 100 mg. of 10% Pd. on carbon during 24 hrs. The catalysts was removed, the solvent evaporated, and the residue partitioned on Sephadex G–25 (f) using the system n-butanol-acetic acid-water (4/1/5). The fraction detected by folin color, which appears at approximately two void volumes, is collected and lyophilized giving 150 mgs. of the above titled product.

TLC $R_f$ 0.65 N BuOH, HOAc.H$_2$O (4/1/1)

Amino acid analysis:
  Thr _____ 1.06
  Lys _____ 1
  Arg _____ 1.02

EXAMPLE 4

L-threonyl-L-lysyl-L-arginine

The compound of Example 3 (20 mg.) is deprotected in 10 ml. trifluoroacetic acid (TFA) at ambient temperature for 20 min. The TFA is removed in vacuo and the resulting oil dissolved in water and passed through a column of AG 1 x 2 100–200 mesh anion exchanger in the free base form. After washing the column with water, the peptide is eluted with 0.2% acetic acid and the eluant lyophilized to yield 7 mg. of the above titled product.

Amino acid analysis:
  Thr _____ 1.02
  Lys _____ 1.0
  Arg _____ 0.98

The luteinizing hormone releasing activity of the compounds of Examples 3 and 4 is determined by radioimmunoassay in a rat pituitary cell culture system as described by Vale et al., Endocrinology 91, p. 562 (1972) and Grant et al., Biochemical and Biophysical Research Communications 51, pp. 100–106 (1973). The compound of Example 3 was found to stimulate luteinizing hormone release at a concentration ranging from 0.05 μg./ml. to 50 μg./ml. The compound of Example 4 was tested at a concentration of 5 μg./ml. and 50 μg./ml. and found to stimulate luteinizing hormone release at both these concentrations. As stimulants of luteinizing hormone, the compounds of Examples 3 and 4 have application in the same areas as the Luteinizing Hormone Releasing Factor (LRF) such as initiation of ovulation and stimulation of fertility as described by Schally et al., Am. J. Obstet. Gynecol. pp. 423–441 (October 1972).

The compounds of Examples 3 and 4 may be administered to warm blooded mammals, including humans, either intravenously, subcutaneously, intramuscularly or orally. The contemplated dose range for oral administration in tablet or capsule form to large mammals is about 0.015 to about 7 mg./kg. of body weight per day while the dose range for intravenous injection in an aqueous solution is about 0.1 μg. to about 0.15 mg./kg. of body weight per day. When administered subcutaneously or intramuscularly a dose range of about 1.5 μg. to about 0.7 mg./kg. of body weight per day is contemplated.

If the active ingredient is administered in tablet form the tablet may contain: a binder such as gum tragacanth, corn starch, gelatin, an excipient such as dicalcium phosphate; a disintegrating agent such as corn starch, alginic acid, etc.; a lubricant such as magnesium stearate; and a sweetening and/or flavoring agent such as sucrose, lactose, wintergreen, etc. Suitable liquid carriers for intravenous administration include isotonic saline, phosphate buffer solutions, etc.

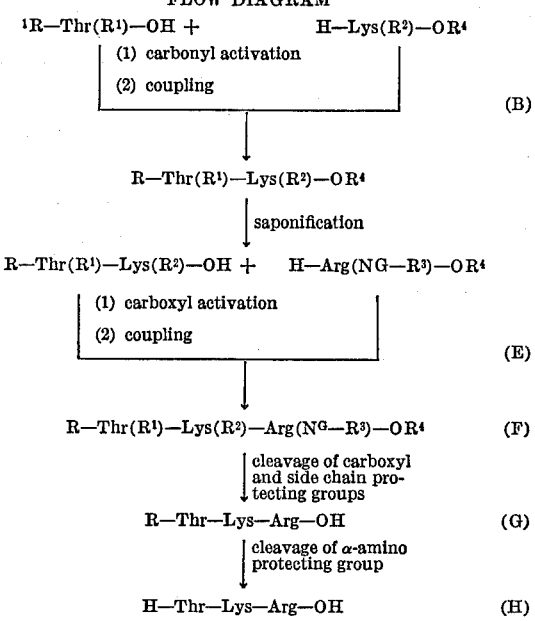

FLOW DIAGRAM

What is claimed is:

1. A compound selected from those of the formula

L-Thr-L-Lys-L-Arg-OH and

R-Thr(R$^1$)-L-Lys(R$^2$)-L-Arg(N$^G$-R$^3$)-OR$^4$ and the non-toxic acid addition salts thereof; wherein:

R is selected from the class consisting of hydrogen and an α-amino protecting group characterized by not being split off during the coupling of the amino acid residues which form said tripeptide and capable of being split off under reaction conditions which will not result in cleavage of the peptide chain and not give rise to side reactions during the synthesis of said tripeptide;

R$^1$ is selected from the class consisting of hydrogen or a protecting group for the alcoholic hydroxyl group of threonine selected from acetyl, benzoyl, tert-butyl, trityl, benzyl and benzyloxycarbonyl;

R$^2$ is selected from the class consisting of hydrogen and a protecting group for the side chain amino substituent of lysine selected from benzyloxycarbonyl, chlorobenzyloxycarbonyl, benzyl, tosyl, 2,4-dinitrophenyl, t-amyloxycarbonyl and t-butyloxycarbonyl;

R$^3$ is hydrogen and a protecting group on at least one of the N$^δ$, N$^ω$ and N$^{ω'}$ nitrogen atoms of arginine selected from nitro, tosyl, benzyloxycarbonyl, adamantyloxycarbonyl and trityl;

R$^4$ is selected from the class consisting of hydrogen, C$_1$–C$_6$ alkyl, benzyl, phenacyl, 4-picolyl, 4-(methylthio)phenyl, phthalimidomethyl, β-methylthioethyl and substituted benzyl wherein the substituent on said benzyl is at least one member selected from the class consisting of nitro, methoxy and methyl; and at least one of R, R$^1$, R$^2$, R$^3$ and R$^4$ being other than hydrogen and when said R is an α-amino protecting group, said group not being the same as the protecting group defined by R$^1$, R$^2$ and R$^3$.

2. A compound according to claim 1 wherein R is tert-butyloxycarbonyl.

3. A compound according to claim 2 wherein R$^1$ is benzyl, R$^2$ is benzyloxycarbonyl and R$^3$ is nitro.

4. A compound according to claim 2 wherein R$^4$ is either a C$_1$–C$_6$ alkyl or benzyl.

5. A compound according to claim 1 wherein at least one of R$^1$, R$^2$, R$^3$ and R$^4$ is hydrogen.

6. A compound according to claim 5 wherein each of R$^1$, R$^2$, R$^3$ and R$^4$ is hydrogen.

7. A compound according to claim 1 wherein the α-amino protecting group is selected from the class consisting of t-butyloxycarbonyl, benzyloxycarbonyl, allyloxycarbonyl, trityl, t-amyloxycarbonyl, phthalyl, tosyl, cyclopentyloxycarbonyl, p-nitrobenzyloxycarbonyl, and p-methoxybenzyloxycarbonyl.

8. A compound according to claim 1 which is selected from the class consisting of L-threonyl-L-lysyl-L-arginine and a non-toxic acid addition salt thereof.

9. A compound according to claim 1 which is selected from the class consisting of tert-butyloxycarbonyl-L-threonyl-L-lysyl-L-arginine and a non-toxic acid addition salt thereof.

10. A compound according to claim 1 which is: tert-butyloxycarbonyl - O - benzyl - L - threonyl-L-benzyloxycarbonyl-L-lysyl-nitro-L-arginine benzyl ester.

References Cited

Najjar et al.: Nature, 228, 673–4 (1970).
Nishioka: Diss. Abstr. Int., 32B, 2888–9 (1971).

LEWIS GOTTS, Primary Examiner

R. J. SUYAT, Assistant Examiner

U.S. Cl. X.R.

424—177